Sept. 18, 1962  B. BAXTER  3,054,593
SELF-SEATING GATE VALVE
Filed Aug. 16, 1961

BENJAMIN BAXTER
INVENTOR
HUEBNER & WORREL
ATTORNEYS
BY Richard M. Worrel

United States Patent Office 3,054,593
Patented Sept. 18, 1962

3,054,593
SELF-SEATING GATE VALVE
Benjamin Baxter, Box 488, Fowler, Calif.
Filed Aug. 16, 1961, Ser. No. 131,805
6 Claims. (Cl. 251—203)

The present invention relates to a self-seating gate valve having special utility in irrigation conduits and more particularly to such a valve which is automatically seated and released by ordinary reciprocable opening and closing movement of a gate within the valve.

Gate valves are customarily employed in irrigation conduits to regulate and to control the flow of irrigating water through such conduits to individual portions of the system. In the past, valves of this type have been employed in large concrete standpipes or the like providing a reciprocable gate lid which is guided during such movement by a pair of opposite guide rails. The gate lid is thereby guided between open and closed positions relative to individual fluid conducting ports within the standpipe. These gate lid arrangements have been difficult to maintain in the desired sealing position against their respective valve seats circumscribing the fluid flow ports. In some installations resilient gaskets have been employed between the seat and the gate lid which are subject to deterioration and increase the resistance encountered when opening and closing the gate lid relative thereto. In order to maintain the gate lid tightly against the port seat, one type of gate valve presently in use employs a bevel wedge member within each of the opposite gate lid channels so that with downward closing movement of the lid the lid is actuated into sealing engagement with the seat. The known disadvantages of this type of gate seating device have been numerous. If excessive force is employed in closing the valve, the wedges are engaged to such an extent that opening of the valve is accomplished only with difficulty. Further, if such valve remains closed for any extended period, the wedges in the guide members are subject to rust and corrosion which makes opening of the valve nearly impossible. In many cases such freezing of the wedge members has necessitated the use of acetylene torches to free the gate lids. Also the gate lid has a tendency to rock transversely of the valve within the guides which tends to apply a greater force to one wedge than to the other. If such closing force is not accurately divided between the opposite wedge members, the gate lid is tipped an amount sufficient to cause leakage through the port even though the outer control handle of the valve indicates that the valve is closed. Further, a rotatable screw type control member is usually employed with this type of valve which is capable of developing forces sufficient to fracture such valve components without the operator being aware of such condition until attempting to re-open the valve.

Another type gate valve commonly in use in such systems provides a reciprocating handle having a rotatable cam member disposed centrally of the gate lid. With such arrangement a secondary motion is required to actuate the locking mechanism in that the gate must be first lowered into a substantially closed position and then the control member rotated to engage the cam to force the gate lid against the seat. With the secondary motion required by such control, a screw type actuating control member is not adaptable to this valve. Another disadvantage with this type of valve is that the force applied to the cam member cannot be accurately gauged effectively to preclude damage resulting from excessive force being applied by the external control member. Again with this type of control member, it is difficult readily to indicate when the valve is fully closed. Such position cannot be observed by the vertical position of the control handle in that the gate may be fully lowered but the cam member may not be actuated. In such instance leakage occurs between the gate lid and the port.

It is therefore an object of the present invention to provide a self-seating gate valve providing improved engaging and releasing operation over that provided by conventional gate valves.

Another object is to provide such a valve which is readily engaged in a closed fluid-sealing position and is releasable therefrom by the usual reciprocatory valve movement employed normally to open and to close the valve.

Another object is to provide a self-seating valve which applies the entire closing force centrally of the gate.

Another object is to provide such a gate valve having a cam and a cam-engaging member automatically tensioned by gate movement to the closed position.

Another object is to provide a self-seating gate valve which is adapted for positive opening action and minimizes or obviates jamming.

Another object is to provide a gate valve which permits a dependable metal-to-metal seal without the use of sealing gaskets.

Another object is to provide a gate valve having a cam engaging member which minimizes forces required to achieve positive operation.

Another object is to provide a self-seating gate valve which is effective to close the valve in fluid-tight sealing relation against fluid flow in either direction through the valve.

Another object is to provide such a gate valve which is economical to produce, easily assembled, economically maintained, and dependable.

Other objects and advantages of the present invention will become more fully apparent in the subsequent descriptions in the specification.

Figure 2:
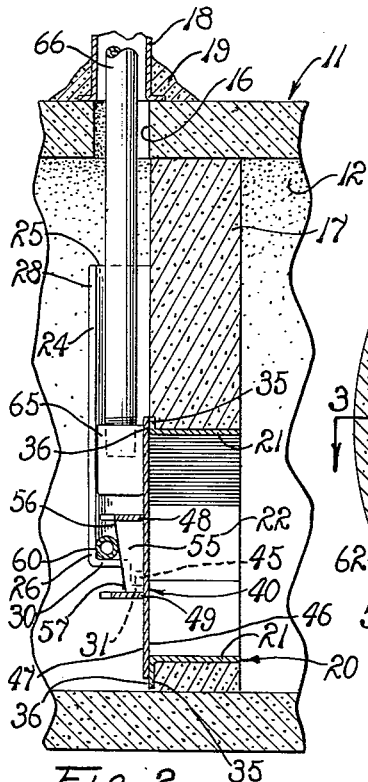
FIG. 2 is a vertical section through the gate valve taken on line 2—2 of FIG. 1.

Referring more particularly to the drawing, a gate valve embodying the principles of the present invention is indicated generally by the reference numeral 10. As shown, the valve is disposed within an irrigation conduit 11 of conventional form constructed of a cementitious material. The valve provides a cylindrical fluid-conducting passage 12 disposed within a circumscribing circular wall 14. The wall provides a radially upwardly directed opening 16 therethrough which communicates with the passage 12 closely adjacent to a transversely extended partition 17 within the passage. The partition is constructed of a similar cementitious material in a manner described in greater detail in my co-pending application Serial No. 116,522. A tubular member 18 is rigidly mounted on the wall 14 of the conduit, as by cementing at 19, and registers with the opening 16 in the wall.

Figure 3:
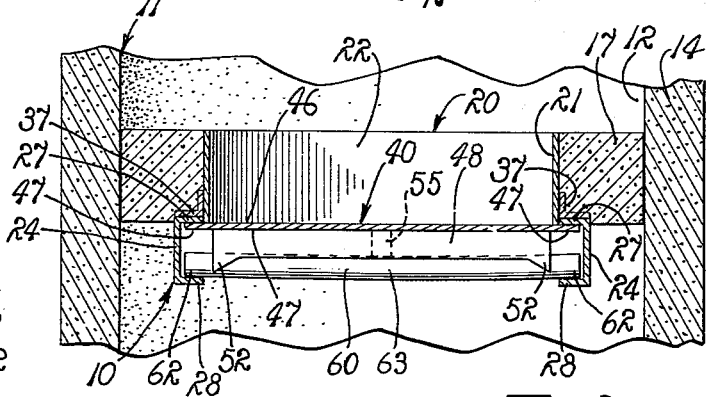
FIG. 3 is a horizontal section of the gate valve taken on line 3—3 of FIG. 1.
Figure 5:
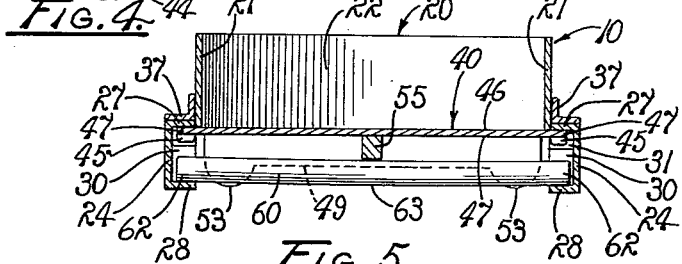
FIG. 5 is a horizontal section showing a tension member associated with the cam portion of the gate taken on line 5—5 of FIG. 1.

A stationary guide member 20 is adapted rigidly to be secured to the partition 17 preferably during the construction thereof also described more fully in my above identified co-pending application. The guide member provides a continuous substantially oval-shaped flange member 21 which extends through the partition 17 to form a port 22 for the flow of fluid therethrough. A pair of oppositely inwardly opening guide channels 24 are vertically extended in substantially parallel relation to each other at opposite sides of the port 22. The guides include upper and lower ends 25 and 26, respectfully, which abut the inner periphery of the wall 14 of the conduit 11. The channels individually provide opposite inner and outer rails 27 and 28, respectfully, in spaced substantially parallel relation to each other. A lower end 26 of the guide is closed by a stepped wall 29 having an upper portion 30 adjacent to the outer wall 28 and a lower portion 31 adjacent to the inner wall 27. A relatively narrow rim portion 35 circumscribes the flange 21 to provide a seat 36. It is noted that the seat, flange, and channel members of the guide member 20 may be constructed integrally of cast iron or other suitable material or they may be constructed separately and joined, as best shown in FIG. 3, by angular welding strips, indicated at 37.

Figure 4:
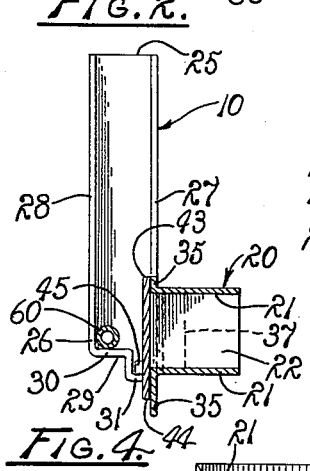
FIG. 4 is a vertical section through the guide member of the gate valve taken on line 4—4 of FIG. 1.

A substantially oval-shaped gate lid 40 is disposed within the conduit 11 and is constrained therein for reciprocable rectilinear movement by a pair of integral transversely extended ears 42 slidably engaging the inner rails 27 of the guide channels 24. The gate lid is constructed of a substantially rigid impervious material, such as sheet metal, and includes opposite upper and lower edges 43 and 44, respectively. The edges are arcuately shaped to conform to the hollow circumference of the conduit 11 and to cover the seat 36 around the oval port 22 through the partition 17. As best shown in FIG. 4, the ears 42 includes opposite foot stop members 45 which are adapted individually to engage the lower wall portions 31 of the guides when the gate is in the closed position of FIG. 1. The gate lid further provides an inner sealing 46 surface for engagement with the seat 36 and an opposite outer surface 47.

A pair of transversely extended vertically spaced substantially parallel cage bars 48 and 49 are rigidly mounted on the outer surface 47 of the gate lid 40. The cage bars terminate in opposite ends 50 and 51, respectively, short of the opposite guide members 24 and have arcuate tip portions 52 and 53, respectively, which extend outwardly to positions closely adjacent to the outer rails 28 of the channels 24. A centrally disposed cam wedge block 55 having an upper peak portion 56 and a lower valley portion 57, is rigidly mounted on the outer surface 47 of the gate lid between the upper and lower cage members 48 and 49. An elongated cylindrical, resiliently flexible hollow rod 60 provides opposite ends 62 rollably engaging the outer rails 28 of the channels 24 and an intermediate portion 63 engaging the cam block 55. A centrally disposed coupling member 65 is rigidly mounted on the outer surface 47 of the gate in vertically aligned relation to the port 22 in the wall of the conduit. A control rod 66 is screw threadably received within the coupling to extend upwardly radially outwardly of the conduit by way of the opening 16 and the tubular member 18. It is readily apparent that the coupling 65, the upper and lower cage members 48 and 49, and the cam block 55 may all be cast integrally with the gate lid 40. Further, the outer end of the control rod 66, not shown, may be provided with any type actuating device effective to reciprocate the gate lid 40 in a vertical rectilinear manner.

*Operation*

The operation of the described embodiment of the subject invention is believed clearly apparent and is briefly summarized at this point. The gate lid is held in the open position indicated by the broken lines of FIG. 1 by the external control mechanism, not shown. With movement of such control mechanism to close the valve, the gate lid 40 is motivated downwardly with the ears 42 sliding against the inner rail 27 of the guides 24. The hollow rod 60 concurrently is carried downwardly therewith on the lower cage bar 49 in rolling contact with the outer rail 28 of the guides. As the gate lid continues such movement toward the closed position, the hollow rod abuts the upper wall portion 30 of the lower end wall 29 of the guides. With continued movement of the gate lid, the cam 55 is positioned downwardly relative to the rod 60, which while rollably traversing the inclination thereof, from the valley portion 57 to the peak 56, forces the gate lid into sealing engagement with the seat 36. Engagement is completed upon abutment of the foot stop members 45 with the lower wall portion 31 of the guides. At such time the rod 60 is resiliently flexed arcuately outwardly at its intermediate portion 63 by the cam effectively to impose the desired force against the gate lid 40. Consequently the gate lid is in fluid-tight engagement with the seat 36. The force exerted against the lid may be preadjusted by varying the material stiffness of the rod 60 or by raising or lowering the foot stop members 45 on the ears of the gate lid. In this way the gate lid precludes any measurable amount of leakage through the valve even in installations directing the flow of fluid against the sealing surface 46 of the lid through the partition 17. It is readily apparent that the gate lid 40 is effectively positioned adjacent to the port 22 in the partition and forced into sealing engagement with the seat 36 thereof by a single downward closing movement of the control rod 66.

Figure 1:
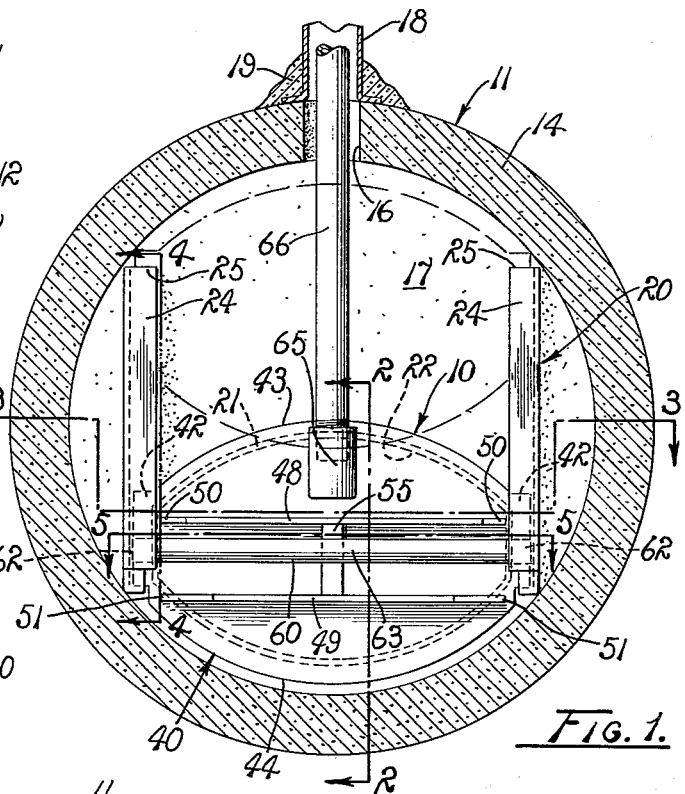
FIG. 1 is a front elevation of a gate valve employing the principles of the present invention disposed within an irrigation conduit shown in transverse section.

When it is desired to open the gate lid 40 to the broken line position of FIG. 1, a quick jerking movement upwardly on the control rod 66 effectively frees the cam block 55 from engagement with the resiliently flexible rod 60. With continuous steady movement in an upward direction, the rod is carried with the gate in rolling relation to the guides 24 by the lower cage bar 49. The gate lid 40 may be stopped at any intermediate vertical position of the conduit 11 or may be raised to the full open position as indicated by the dotted lines in FIG. 1 by the external control device, not shown.

From the foregoing it is readily apparent that the gate lid 40 of the present invention is readily seated in a closed fluid-tight sealing position against the valve seat 36 by a single movement of the control rod 66. Similarly the gate lid is opened by a single movement of the control rod without the rotary motion usually required in conventional valves of this kind. Further, the entire closing force is applied centrally of the gate lid effectively to preclude cocking or twisting of the lid within the guide channels 24 for unrestricted movement between the opened and closed positions. It is also apparent that if the gate lid remains in a closed position for any extended period permitting the formation of rust or corrosion on the movable parts of the mechanism, namely the cam 55, the hollow rod 60 and the guide channels 24, such does not lock or jam the parts together as in conventional valves since the spring action of the rollable hollow rod permits such connection to be readily disengaged. With the force supplied by the cam and hollow rod arrangement no gasket is necessary between the gate lid and the seat which in conventional valves tends to hinder or restrict opening and closing movement of the gate lid. Further, such arrangement is effective to seal the port 22 within the conduit against flow in either direction through the passage 12 therein.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A valve, for conduits having valve mounting means disposed therein, comprising a seat connected to such mounting means, guide means connected to said mounting means adjacent to said seat, a gate slidably constrained within said guide means for movement between open and closed positions relative to said seat, a cam mounted on the gate, and resiliently flexible means carried by said gate and rollably constrained in said guide means, said flexible means having a portion thereof contacting said cam automatically to urge the gate against said seat in fluid-tight sealing relation therewith during movement of the gate into said closed position.

2. A valve, for conduits having a fluid conducting passage therein and a partition disposed transversely of the passage providing a port therethrough, comprising a seat mounted on such a partition in circumscribing relation to the port, guide means mounted on said partition adjacent to said seat in upwardly extended relation therefrom, a gate slidably constrained within said guide means for reciprocal rectilinear movement transversely of said passage between open and closed positions relative to said seat, a cam mounted on the gate, resiliently flexible means having opposite ends rollably constrained within said guide means, and means mounted on said gate retaining said rod for movement with the gate, said flexible means contacting the cam during such movement automatically to urge the gate in fluid-tight sealing relation against said seat in said closed position of the gate.

3. A valve, for conduits having a fluid conducting passage therein and a partition disposed transversely of the passage providing a port therethrough, comprising a seat mounted on such a partition in circumscribing relation to the port, guide means mounted on said partition adjacent to said seat in upwardly extended relation therefrom, a gate slidably constrained within said guide means for reciprocal rectilinear movement transversely of said passage between open and closed positions relative to said seat, a cam mounted on the gate, a resiliently flexible rod having opposite ends rollably constrained within said guide means, cage means mounted on said gate supporting said rod in overlying relation to said cam for limited relative movement between the rod and the cam, and stop means in said guide means engaging said rod automatically to urge the gate in fluid-tight sealing relation against said seat upon such relative movement between the cam and the rod during movement of the gate into said closed position.

4. A valve, for irrigation conduits having valve mounting means disposed therein, comprising a seat rigidly connected to said mounting means, guide means connected to said mounting means adjacent to said seat, a gate having opposite transversely outwardly extended ears slidably constrained within said guide means for reciprocal rectilinear movement transversely of such conduits between open and closed positions relative to the seat, a cam mounted on the gate, a resiliently flexible rod having opposite ends rollably constrained within said guide means, a cage having upper and lower transversely horizontally disposed vertically spaced bars mounted on said gate supporting the rod in overlying relation to said cam for limited movement relative to the cam, and a stop rigidly mounted in closing relation to said guide means engaging the rod during movement of the gate to said closed position to cause said rod to roll upwardly on the cam whereby the rod is flexed intermediate its ends imposing a reactive force against the gate effectively to seat the same in fluid-tight sealing relation upon the valve seat.

5. A self-seating valve, for irrigation conduits having valve mounting means providing a substantially oval fluid flow directing port therethrough, comprising a seat rigidly connected to such mounting means in circumscribing relation to said port, opposite inwardly opening guide channels rigidly secured to said mounting means adjacent to said seat, a gate having opposite transversely outwardly extended ears slidably constrained within said guide channels for reciprocable rectilinear movement transversely of such conduits between open and closed positions relative to the seat, said gate including an inner sealing surface facing said seat and an opposite outer surface, a cam rigidly mounted on said outer surface of the gate, a resiliently flexible cylindrical rod having opposite ends rollably constrained within said guide channels in spaced relation to said ears of the gate, a cage having upper and lower transversely horizontally disposed vertically spaced bars mounted on said outer surface of the gate respectively above and below said cam loosely supporting the rod in overlying relation to the cam, said rod being movable relative to the cam between the bars, and a stop rigidly mounted in closing relation to the guide channels for engaging the rod during movement of the gate toward said closed position to cause said rod to roll upwardly on the cam toward said upper bar of the cage whereby the rod is flexed intermediate its ends to impose a reactive force against the gate automatically to seat the same in fluid-tight sealing relation against the valve seat, and said gate being readily retractable from said closed position by upward movement of the gate toward said open position by said rollable engagement of the rod with the cam.

6. A self-seating velve for irrigation conduits having valve mounting means providing a substantially oval fluid flow directing port therethrough, comprising a seat rigidly connected to such mounting means in circumscribing relation to said port, opposite inwardly opening guide channels having inner rails rigidly secured to said mounting means adjacent to said seat and outer rails outwardly spaced in substantially parallel relation to said inner rails, a gate having opposite transversely outwardly extended ears slidably constrained within said guide channels against said inner rails thereof for reciprocable rectilinear movement transversely of such conduits between open and closed positions relative to the seat, said gate including an inner sealing surface facing said seat and an opposite outer surface, said ears of the gate including depending foot portions, a cam centrally rigidly mounted on said outer surface of the gate, a resiliently flexible cylindrical rod having opposite ends rollably constrained within said guide channels against said outer rails thereof in outwardly spaced relation to said ears of the gate, a cage having upper and lower transversely horizontally disposed vertically spaced bars mounted on said outer surface of the gate respectively above and below said cam supporting the rod in overlying relation to the cam, said rod being movable relative to the cam between the bars, a first stop rigidly mounted in closing relation on the guide channels adjacent to said outer rails thereof for engaging the rod during movement of the gate toward said closed position to cause said rod to roll upwardly on the cam toward said upper bar of the cage whereby the rod is flexed intermediate its ends to impose a reactive force against the gate automatically to seat the same in fluid-tight sealing relation against the valve seat, and a second stop rigidly mounted in closing relation on the guide channels adjacent to said inner rails thereof for engaging the foot portions of the gate ears accurately to position the gate adjacent to the seat and to control said flexing of the rod incident to cam engagement, and said gate being readily retractable from said closed position by upward movement of the gate toward said open position by said rollable engagement of the rod with the cam.

References Cited in the file of this patent

UNITED STATES PATENTS

| | | |
|---|---|---|
| 356,758 | Geiger | Feb. 1, 1887 |
| 832,843 | Collar | Oct. 9, 1906 |
| 853,168 | Garbe | May 7, 1907 |
| 1,084,855 | Genter | Jan. 20, 1914 |
| 1,482,836 | Brubaker | Feb. 5, 1924 |
| 1,536,300 | Longtime | May 5, 1925 |